June 27, 1961  C. E. POYNTER  2,989,902
BROACHING, AND BROACHING MACHINES
Filed May 8, 1959  3 Sheets-Sheet 1
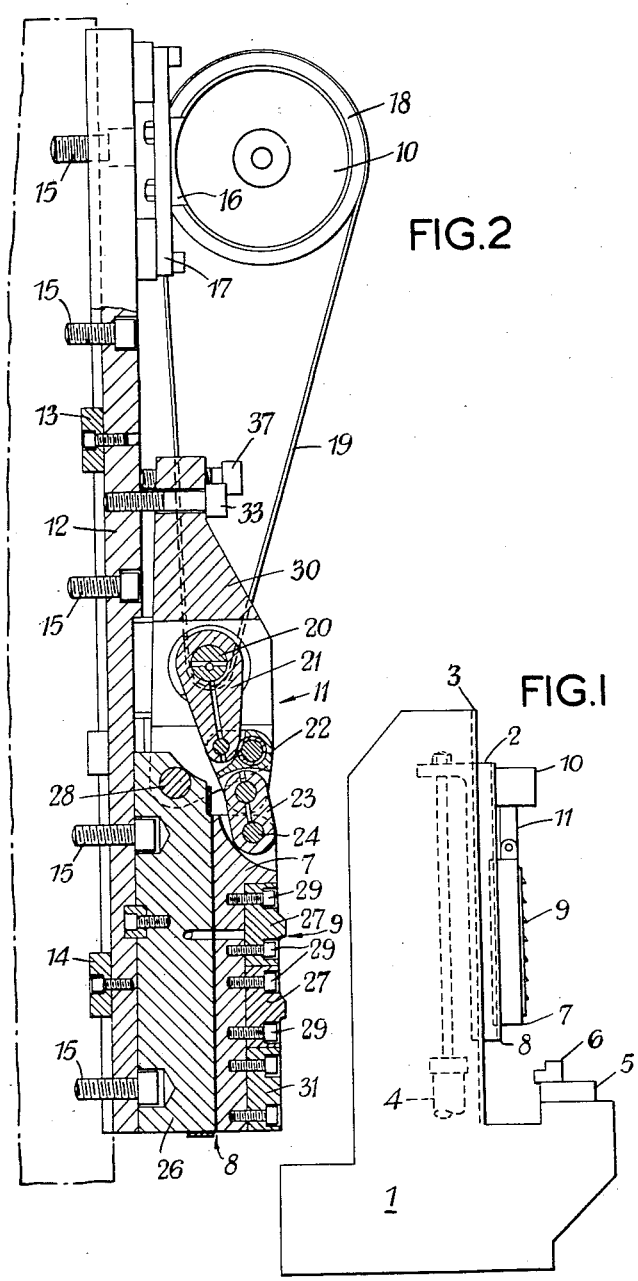
INVENTOR
CYRIL E. POYNTER

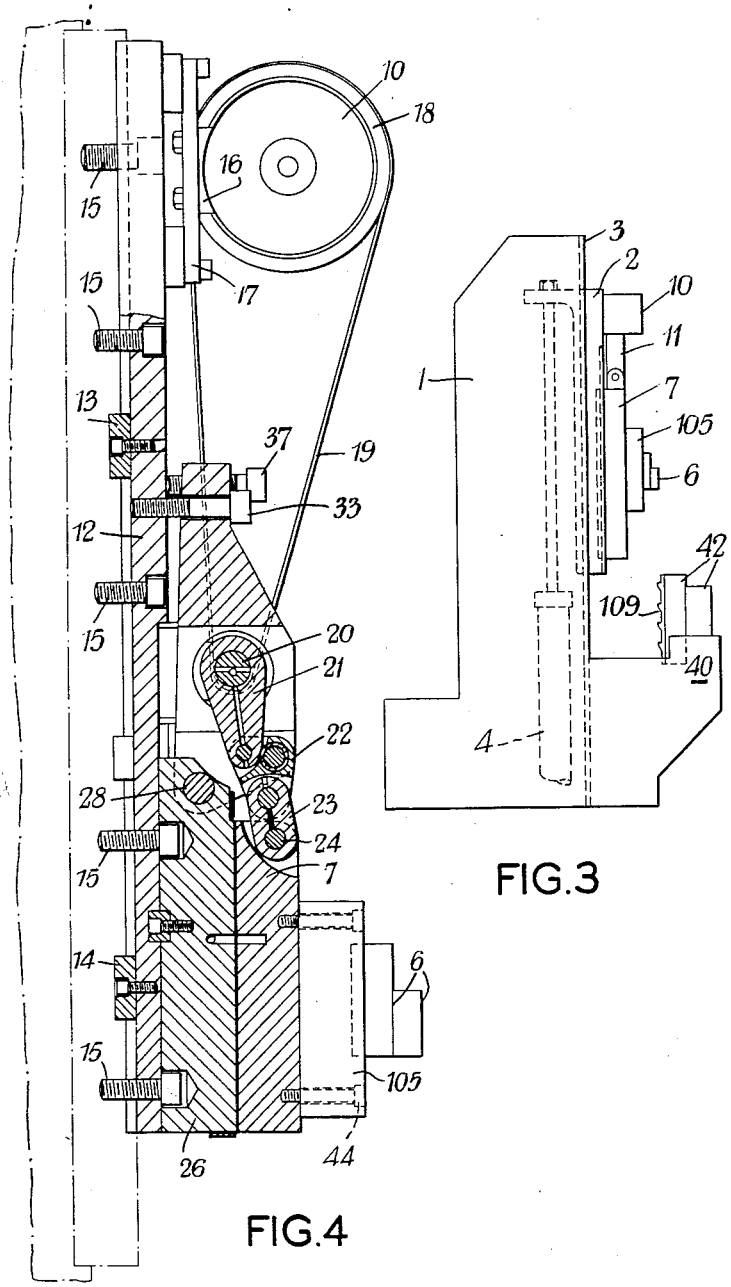

June 27, 1961  C. E. POYNTER  2,989,902
BROACHING, AND BROACHING MACHINES
Filed May 8, 1959 3 Sheets-Sheet 3

INVENTOR
CYRIL E. POYNTER

United States Patent Office 2,989,902
Patented June 27, 1961

2,989,902
BROACHING AND BROACHING MACHINES
Cyril Edward Poynter, Biggleswade, England, assignor to Weatherley Oilgear Limited, Biggleswade, England
Filed May 8, 1959, Ser. No. 811,910
Claims priority, application Great Britain May 16, 1958
5 Claims. (Cl. 90—96)

This invention relates to the broaching art and more particularly to an improved method of broaching and machines for performing such method.

In the art of internal or surface broaching metal workpieces, whether by pull or push methods, several factors are involved in producing satisfactory work at an economical price. The capital cost of broaching equipment is normally at least as high as that of alternative equipment, and broaching tools are usually expensive and considerable time is involved in sharpening such tools. Moreover, due to the heat and pressures involved, the cutting teeth of the tools tend to weld to the material of the workpiece and this induces chatter between the workpiece and the tool.

Having in mind the defects of the prior art methods and machines, it is the primary object of the present invention to provide an improved method of broaching and machines for carrying out that method which produces a good finish with economical power expenditure and useful tool life being obtained.

According to the invention, from one aspect, a method of broaching is provided wherein the conventional continuous cutting movement of a toothed tool over the workpiece is interrupted by regular reversals of such movement thereby causing the teeth of the tool to be momentarily relieved of cutting pressure.

Put in another way, the invention provides a method of broaching a metal workpiece with a toothed tool by imparting relative linear displacement between the workpiece and the tool wherein the displacement comprises multiple small reciprocatory strokes each with relative movement in a cutting sense greater than relative movement in the opposite sense.

Multiple small reciprocatory strokes means strokes having a length of a small fraction of an inch and a frequency related to the speed of linear displacement such as to insure a multiplicity of strokes in an operation upon a workpiece. Such frequency of the strokes must be in the sonic or subsonic range.

From another viewpoint, the invention provides a method of broaching a metal workpiece in which the cutting edge of a tooth of the broaching tool is moved relatively to the workpiece in such a manner that it alternately engages the workpiece to cut material therefrom and is retracted to relieve pressure thereon, such alterations being of sonic or subsonic frequency and of small dimension.

It is immaterial whether movement is imparted solely to the tool, solely to the workpiece or partially to the tool and partially to the workpiece. In one embodiment the workpiece is generally held stationary while in operative relationship with the tool which moves.

A broaching machine for performing the improved method comprises essentially a workpiece holder and a tool holder, means for imparting to at least one of the said holders a sonic or subsonic frequency reciprocatory movement of small dimension and means for imparting at the same time to at least one of the said holders a linear movement solely in a cutting sense.

A preferred form of the machine comprises a work holder which is stationary during broaching, a broach bar for moving at least one toothed tool at a steady speed past the workpiece and means carried by the broach bar for imparting to the tool a secondary reciprocating motion of sonic frequency for periodically retracting the cutting edges of the tool from the workpiece. The means for moving the broach bar may be a conventional hydraulic ram arrangement or a rack and pinion or similar mechanical drive; and the means for imparting the secondary reciprocating movement may be mechanical, such as a motor-driven crank and connecting rod drive; electrical, such as a solenoid; or pneumatic or hydraulic, such as a ram or motor fed with pulsating pressure fluid.

The theory behind the invention is bound up with the basic theories of the cutting of materials with toothed tools. One of the limiting factors in the production of good finishes is due to the tendency toward a welding of the chips formed by cutting, to the cutting face of the tool, and lubricants are employed to minimize the detrimental effects of said tendency. Improved results are obtained by the provision for periodic access of lubricant (whether liquid or gaseous) between the cutting edges of the tool and the work. It is well known that the start of a cut from the edge of a workpiece generally has a better finish than later parts of the cut, and the present invention enables such better finish over the whole length of a cut due to the making of the cut, in effect, by a series of fresh starts.

Work with a broaching tool at a given broaching speed upon a heat resisting metal results in greatly improved finish and much less power consumption when the tool is given a high speed secondary reciprocating motion of the order of 100 c.p.s. The actual pitch and frequency of reciprocating movement must be related to the overall cutting speed, the nature of the material cut, the depth to cut per tooth and so on. Generally speaking, a very small parting of a tooth from the work on a reverse movement should be aimed at; a gap of about .001″ or even of submicronic order will suffice in most cases.

Where other considerations permit, it is desirable to employ a number of tools upon a single broach bar and to impart to all of the tools a requisite reciprocating motion with the movements of the several tools arranged at specific out-of-phase relation so as to balance resultant vibration and related vibration in the tool drive means and its support.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a diagrammatic side elevational view of a vertical surface broaching machine of the type having a fixed workpiece;

FIG. 2 is an enlarged vertical sectional view of a form of tool reciprocating drive for machines such as shown in FIG. 1;

FIG. 3 is a diagrammatic side elevational view of another type of vertical broaching machine wherein the broach tool is stationary;

FIG. 4 is an enlarged vertical sectional view of a part of the machine of FIG. 3, illustrating a drive mechanism for the workpiece.

Figure 5:
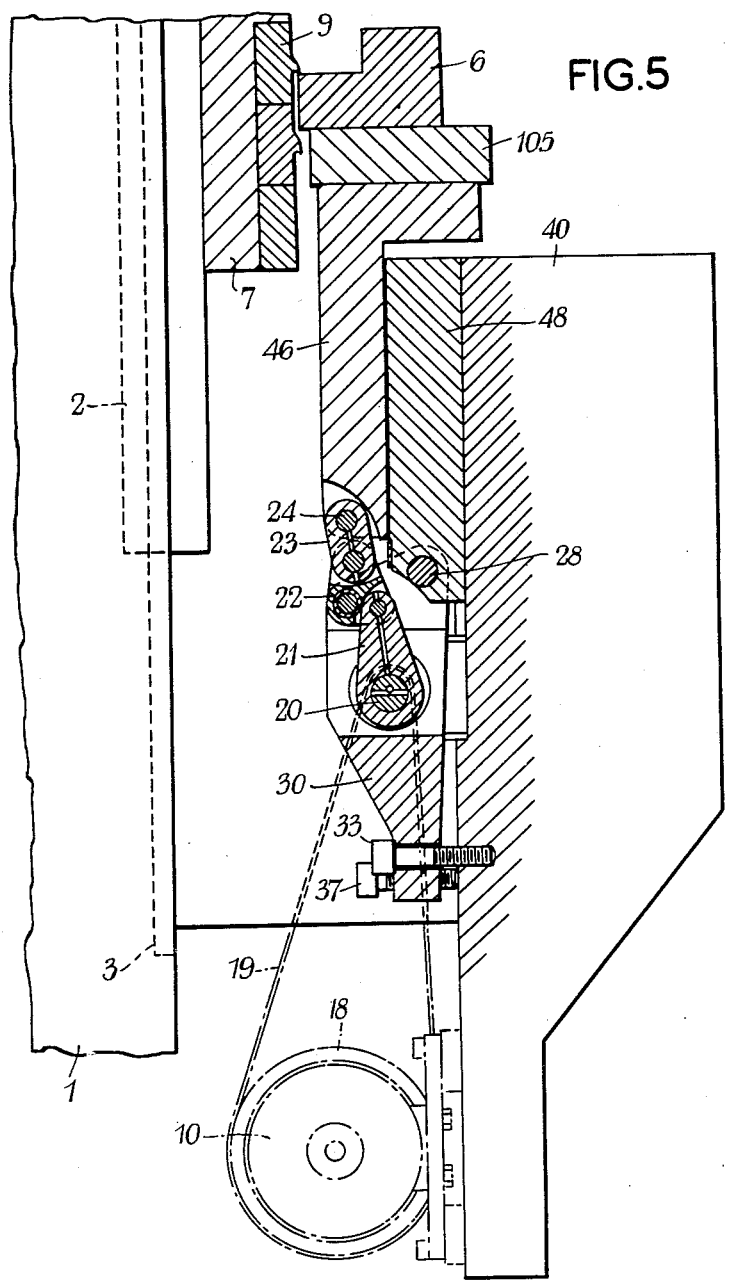
FIG. 5 is a vertical sectional view of another embodiment wherein the broach tool moves in a linear path and the workpiece is vibrated.

Referring more particularly to the drawings, specifically to FIG. 1, a machine according to the invention may comprise a frame 1 having a vertically disposed guideway 3 along which a support 2 is slidably reciprocated as by a conventional hydraulic ram drive 4. The frame 1 also includes a work table 5 (which may be arranged to shuttle in and out of operative position or to rotate about a vertical or horizontal axis in known manner to present fresh workpieces) supporting a workpiece 6. The support 2 has a vertically disposed guideway 8 along which a tool holder 7 is reciprocated by a suitable drive apparatus including a power unit 10 mounted on the support 2 and connected by a transmission 11 with the tool holder 7. A toothed broaching tool 9, having cutting teeth 27, is locked to holder 7 by conventional means.

In operation, the ram 4 reciprocates the broach bar 2 relative to the frame 1 and simultaneously the power unit 10 and transmission 11 reciprocates the tool holder 7 relative to the bar 2. With the support 2 traversing the work holder 5 at a speed of 3 or 4 ft. per minute, and the tool holder 7 having a reciprocation of, say, 100 c.p.s., multiple small forward and reverse strokes of the tool 9 and its teeth 27 take place relative to a workpiece. In such an instance, an amplitude of reciprocating movement of the tool holder 7 of the order of .004" will result in complete release of cutting force by the teeth 27 of the tool 9 and actual separation of the cutting edges of the teeth from the position of cut.

The power unit 10 may comprise any suitable reciprocatory or vibratory device and the transmission 11 may comprise any suitable connection, as schematically shown in FIG. 1; or the power unit 10 may comprise any suitable rotary motor and the transmission any suitable rotary to reciprocatory drive, a specific embodiment of which is shown in FIG. 2. For convenience, the structure illustrated in FIG. 2 is shown as an assembly for attachment to a broach bar, such as the support 2, of an existing broaching machine, although it is obvious that similar structure may be incorporated in new machines.

The assembly shown in FIG. 2 comprises a backing plate 12, provided with keys 13 and 14 for entering locating keyways in the support 2 which is fixed to the support by screws 15, and a block 26 is fixed to the backing plate 12. The power unit 10 may comprise an electric motor whose base 16 is shown bolted to a base plate 17 secured to the backing plate 12, and which drives a pulley 18. The transmission 11 may comprise a belt 19 trained around the pulley 18 and a further pulley (not shown) which drives at a higher speed an eccentric 20 journaled in a carrier 30 that is attached to the block 26.

The eccentric 20 is connected through a linkage, including a link 21, bell crank 22 pivotally mounted on the carrier 30, and a link 23, to a pin 24 fitted across one end of the tool holder 7. The tool holder 7 slides in the guideway 8 on the block 26. The surface broaching tool 9 is illustrated as comprised by a plurality of toothed segments each including a tooth 27, two being shown for purposes of illustration, fixed to the holder 7 by screws 29 and maintained in position by a block 31.

The carrier 30 conveniently is connected to the block 26 by a pivot 28 and adjusted angularly relative to the backing plate 12 by a set screw 37 and a clamp screw 33. The angulation of the carrier 30 relative to the backing plate 12 selectively determines the stroke of the tool holder 7 by the linkage 21, 22, 23. Thus, if a longer vibration stroke is desired, the clamp screw 33 is selectively unthreaded and set screw 37 is threaded to pivot carrier 30 clockwise. This moves link 21 closer to an imaginary line perpendicular to the axis of the leg of bell crank 22 to which the link 21 is connected. The pulley 18 is driven at, say, 1,200 r.p.m. resulting a revolution of the eccentric 20 at, say, 6,000 r.p.m. and a reciprocation of the tool holder at 100 c.p.s. as previously described.

Referring now more particularly to FIGS. 3 and 4, another tool and workpiece arrangement is shown wherein the broach tool 109 is stationarily mounted in a tool holder 42 secured to a machine table or support 40. The subsidiary slide 7 carries a work holder 105 secured by bolts 44 or other suitable means, and a workpiece 6 is carried by the work holder 105. The remainder of the machine is the same as that of FIGS. 1 and 2. The operation is the same except for the fact that the workpiece 6 is moved with respect to the stationary tool 109.

FIG. 5 shows an embodiment wherein both the workpiece and the tool are moved. In this construction, the power unit 10 and transmission 11 are attached to the machine table 40. A slide 46 mounted on a guideway 48, which is fixed to the machine table, carries the workpiece 6. The tool 9 is carried by holder 7 which is securely fastened to the support or main slide bar 2 driven by the ram 4. Thus, the tool 9 is moved in a uniform linear path while the workpiece 6 is vibrated.

It will also be clear that the linear relative motion (as opposed to the reciprocating motion) between tool holder and workpiece may be non-uniform in velocity and that the frequency of the reciprocating motion may also be varied during the course of a cutting operation.

The present invention prevents freezing, welding or seizing of the chip to the cutting edge by the functioning of the periodic pressure release and this results in:

(1) Cuts 4 and 5 times as thick as normal being taken, without deterioration of the surface finish and tool life. Thus, it is possible to use shorter and more economical tools and smaller machines.

(2) A surface finish far superior to that attainable with conventional broaching. Surface finishes in the order of 6 to 10 microinches being easily attainable.

(3) Free flow of the chip over the tool face reducing the tool wear and thus enabling the dimensional similarity to each workpiece produced to be held for a greater number of pieces than can be obtained by conventional broaching methods.

Although certain specific embodiments of the invention have been shown and described, it is obvious that many modifications thereof are possible. The invention, therefore, is not to be restricted execept insofar as is necessitated by the prior art and by he spirit of the appended claims.

That which is claimed is:

1. A broaching machine comprising a frame, a first holder on said frame, a second holder mounted on said frame for movement longitudinally past said first holder, means on said frame for reciprocating said second holder at a steady speed through relatively long strokes, a third holder mounted on said frame for parallel linear reciprocatory movement relative to said second holder, means on one of said first and third holders for supporting a workpiece, means on the other of said first and third holders for supporting a broaching tool, and drive means on said second holder for reciprocating said third holder in small strokes relative to the strokes of said second holder and at sonic or subsonic speed to impart relative working movement between the tool and workpiece including a linear movement of steady speed and simultaneously a multiplicity of small reciprocatory movements.

2. A broaching machine according to claim 1 wherein said drive means comprises a motor on said second holder, a crank journaled on said second holder and driven by said motor, and a link mechanism connected between said crank and said third holder.

3. In a broaching machine, a stationary work holder, a toothed tool, broach bar means for rapidly moving said tool at a steady speed past the workpiece, means carried by the broach bar means for simultaneously imparting to the tool a secondary reciprocating motion of sonic or subsonic frequency and of small dimension parallel to said broach bar movement for periodically retracting the cutting edge of the tool from the workpiece, said means for imparting reciprocatory motion to the tool comprises a tool holder, guideways for said holder on said broach bar, and drive means on said broach bar and including an electric motor, crank and link mechanism for sliding said holder in the guideways.

4. A broaching machine comprising a frame, a first holder on said frame, a second holder mounted on said frame for movement longitudinally past said first holder, a third holder mounted on one of said holders for parallel linear reciprocatory movement relative to said second holder, means on one of said holders for supporting a workpiece, means on another of said holders for supporting a broaching tool, said holders and said supporting means being arranged to prevent springing movement of the workpiece and tool laterally of the line of movement of said holders with respect to each other, power drive means on said frame for reciprocating said second holder at a steady speed through relatively long strokes and with sufficient force to cause said broaching tool to cut said workpiece along the full length of the face portion of the workpiece engaged by the tool during each stroke, and second power drive means on the holder supporting said third holder for reciprocating said third holder in small strokes relative to the strokes of said second holder and at sonic or subsonic speed to impart relative working movement between the tool and workpiece including a linear movement of steady speed and simultaneously a multiplicity of small reciprocatory movements in the direction of said linear movement.

5. A broaching machine according to claim 4 wherein said first holder is stationary on said frame, and said third holder is movably mounted on said first holder.

References Cited in the file of this patent
UNITED STATES PATENTS

| | | |
|---|---|---|
| 46,758 | Morgan | Mar. 7, 1865 |
| 1,292,494 | Lorenz | Jan. 28, 1919 |
| 2,412,211 | Eichelman | Dec. 10, 1946 |
| 2,452,211 | Rosenthal | Oct. 26, 1948 |
| 2,876,683 | Poynter | Mar. 10, 1959 |

OTHER REFERENCES

"25 Percent Speed Increases by New Drilling Technique," by W. A. Phair, Iron Age, June 17, 1943, pages 48–51.